US00RE47847E

(19) United States
(12) Reissued Patent
Waitesmith

(10) Patent Number: US RE47,847 E
(45) Date of Reissued Patent: Feb. 11, 2020

(54) COSMETIC BRUSH

(71) Applicant: ARTIS LLC, Jersey City, NJ (US)

(72) Inventor: Matthew Waitesmith, Jersey City, NJ (US)

(73) Assignee: ARTIS LLC, Jersey City, NJ (US)

(21) Appl. No.: 29/650,930

(22) Filed: Jun. 11, 2018

Related U.S. Patent Documents

Reissue of:
(64) Patent No.: Des. 699,041
Issued: Feb. 11, 2014
Appl. No.: 29/425,384
Filed: Jun. 22, 2012

U.S. Applications:
(60) Division of application No. 29/554,344, filed on Feb. 10, 2016, now Pat. No. Re. 46,939, which is an
(Continued)

(51) LOC (12) Cl. ..... 04-02
(52) U.S. Cl.
USPC ..... D4/138; D4/104; D4/134
(58) Field of Classification Search
USPC ..... D4/104, 105, 106, 107, 109, 111, 112, D4/132, 134, 136, 138
(Continued)

(56) References Cited

U.S. PATENT DOCUMENTS 1,193,287 A * 8/1916 Morgan ..... 15/188
D54,815 S 4/1920 Campbell
(Continued)

FOREIGN PATENT DOCUMENTS

CN 201453625 U * 5/2010
CN 301434919 S 1/2011
(Continued)

OTHER PUBLICATIONS

Office Action dated Nov. 18, 2016 in U.S. Appl. No. 29/554,344.
Office Action dated Feb. 24, 2012 in U.S. Appl. No. 12/425,182.
(Continued)

*Primary Examiner* — Philip S Hyder
(74) *Attorney, Agent, or Firm* — Leason Ellis LLP

(57) CLAIM

The ornamental design for a cosmetic brush, as shown and described.

DESCRIPTION

*This application is a reissue divisional application. This application is a divisional of U.S. Reissue application Ser. No. 29/554,344, which is a reissue of U.S. Design Pat. No. D699,041, issued on Feb. 11, 2014, which is a continuation of application Ser. No. 12/425,182, filed on Apr. 16, 2009, now abandoned.*

*FIG. 4 is a top view of a cosmetic brush showing a first embodiment my new design;*
*FIG. 5 is a side view thereof;*
*FIG. 6 is a bottom view thereof;*
*FIG. 7 is a top view of a cosmetic brush showing a second embodiment of my new design;*
*FIG. 8 is a side view thereof; and,*
*FIG. 9 is a bottom view thereof.*

Figure 1:
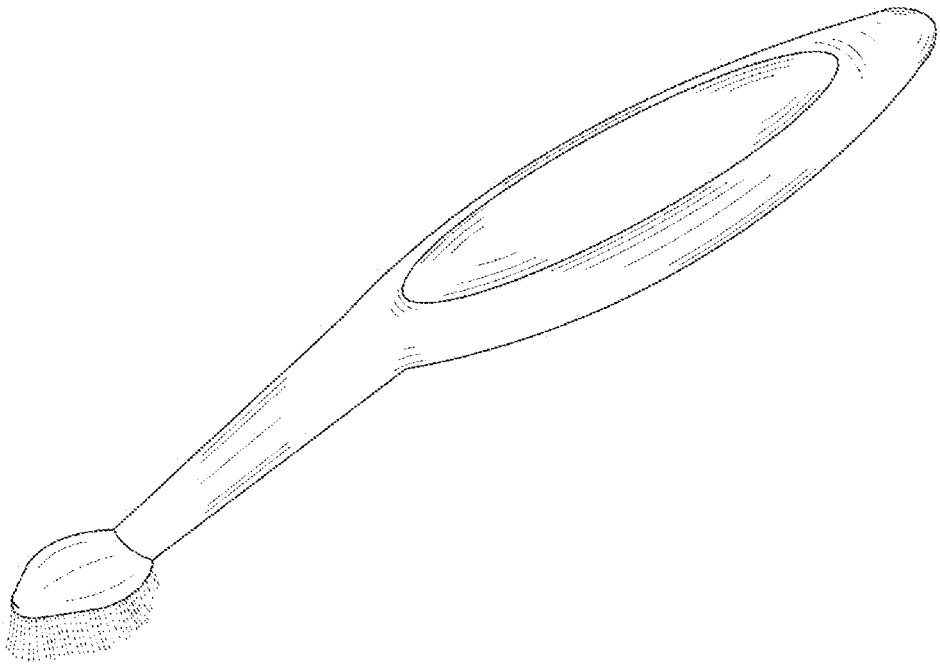
[FIG. 1 is a top perspective view of a cosmetic brush showing my new design.]
Figure 2:
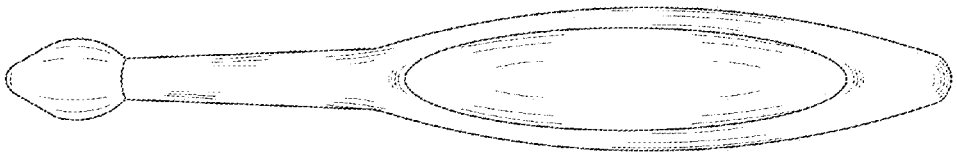
[FIG. 2 is a top view of a cosmetic brush showing my new design; and,]
Figure 3:
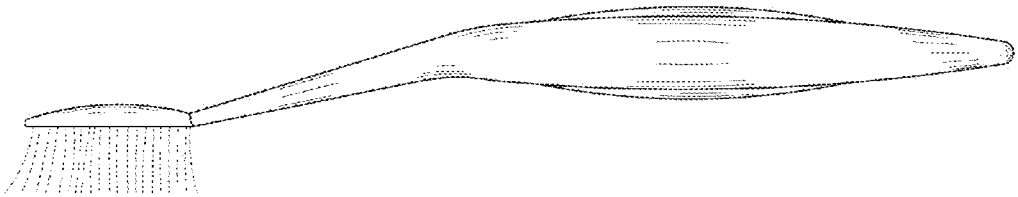
[FIG. 3 is a first side view of a cosmetic brush showing my new design.]

The ornamental design which is claimed is shown in solid lines in the drawings. The broken lines in the drawings are for illustrative purposes only and form no part of the claimed design.

1 Claim, 5 Drawing Sheets

Matter enclosed in heavy brackets [ ] appears in the original patent but forms no part of this reissue; matter printed in italics indicates the additions made by reissue.

New

New

Related U.S. Application Data application for the reissue of Pat. No. Des. 699,041, which is a continuation of application No. 12/425,182, filed on Apr. 16, 2009, now abandoned.

(58) Field of Classification Search
CPC ..... A46B 5/02; A46B 11/0003; A46B 5/026; A46B 9/04
See application file for complete search history.

(56) References Cited

U.S. PATENT DOCUMENTS

| | | | | |
|---|---|---|---|---|
| 1,647,453 | A | 11/1927 | Krantz | |
| 1,657,450 | A | 1/1928 | Barnes | |
| D112,719 | S | 12/1938 | Miller | |
| D165,862 | S * | 2/1952 | Partridge | D4/134 |
| 2,706,825 | A | 4/1955 | Blakeman | |
| 3,065,480 | A | 11/1962 | Sexton | |
| D243,422 | S * | 2/1977 | Varga | D4/104 |
| 4,165,755 | A | 8/1979 | Cassai | |
| D255,511 | S | 6/1980 | Hill et al. | |
| 4,227,276 | A | 10/1980 | Ginsburg | |
| 4,330,896 | A | 5/1982 | Booth | |
| 4,598,437 | A | 7/1986 | Ernest et al. | |
| D303,323 | S | 9/1989 | Saunders | |
| D336,991 | S | 7/1993 | Makinami | |
| D346,902 | S | 5/1994 | Makinami | |
| 5,315,730 | A | 5/1994 | Kim et al. | |
| D357,123 | S * | 4/1995 | Brown et al. | D4/104 |
| 5,476,334 | A | 12/1995 | Tello-Vallarino | |
| 5,511,276 | A | 4/1996 | Lee | |
| D373,250 | S * | 9/1996 | Cavazza | D4/104 |
| D387,203 | S * | 12/1997 | Matharu | D4/104 |
| 5,842,488 | A | 12/1998 | Belleau et al. | |
| 5,881,421 | A | 3/1999 | Ducharme | |
| 6,039,051 | A | 3/2000 | Dorf | |
| 6,050,273 | A | 4/2000 | Lhuisset | |
| 6,108,847 | A * | 8/2000 | Cueman et al. | 15/104.94 |
| 6,234,798 | B1 | 5/2001 | Beals et al. | |
| D482,532 | S | 11/2003 | Masini et al. | |
| 6,687,940 | B1 | 2/2004 | Gross et al. | |
| 6,779,532 | B2 | 8/2004 | Dorf | |
| 7,182,542 | B2 | 2/2007 | Hohlbein | |
| D589,258 | S * | 3/2009 | Littmann et al. | D4/104 |
| 7,823,593 | B2 | 11/2010 | Gueret | |
| 2005/0188486 | A1 | 9/2005 | Tubman | |
| 2007/0124880 | A1 | 6/2007 | Petner et al. | |
| 2007/0143942 | A1 * | 6/2007 | Fox et al. | 15/143.1 |

FOREIGN PATENT DOCUMENTS

| | | | |
|---|---|---|---|
| DE | 199 00 784 | A1 | 7/2000 |
| EP | 1 647 198 | A2 | 4/2006 |
| GB | 2051937 | A | 3/1996 |
| JP | S51-130355 | U | 10/1976 |
| JP | S61-028428 | U | 2/1986 |
| JP | S61-068723 | U | 5/1986 |
| JP | H08 154726 | A | 6/1996 |
| JP | H11 512310 | A | 10/1999 |
| JP | 2002-511286 | A | 4/2002 |
| JP | 2003 033218 | A | 2/2003 |
| JP | 2006-081760 | A | 3/2006 |
| JP | 2006 110350 | A | 4/2006 |
| JP | 2007 319211 | A | 12/2007 |
| JP | 2008-006282 | A | 1/2008 |
| JP | 2008 539952 | A | 11/2008 |
| KR | 300022366 | S | 5/1978 |
| WO | 97-35498 | A1 | 10/1997 |

OTHER PUBLICATIONS

Office Action dated Oct. 28, 2011 in U.S. Appl. No. 12/425,182.
Office Action dated Dec. 6, 2012 in U.S. Appl. No. 29/425,384.
Office Action dated Jul. 8, 2013 in U.S. Appl. No. 29/425,384.
Office Action dated Nov. 8, 2013 in U.S. Appl. No. 29/425,384.
Artis Makeup Brushes, as posted at Forbes [online], posted on Sep. 23, 2014 [site visited May 13, 2016]. Obtained from: <URL: http://www.forbes.com/sites/sarahwu/2014/09/23/the-best-makeup-brushes-do-double-duty-as-objets-darts/#437d137b151e>.
MAC Masterclass Brush Collection, as posted at the Blonde & the Brunette [online], posted on Nov. 20, 2013 [site visited May 13, 2016]. Obtained from: <URL: http://theblondeandthebrunette.com/beauty-scoop-mac-masterclass-brush-collection/>.
Office Action dated May 19, 2016 in U.S. Appl. No. 29/484,458.
Office Action dated Dec. 4, 2014 in U.S. Appl. No. 29/484,458.
Office Action dated Dec. 8, 2014 in U.S. Appl. No. 29/484,466.
Office Action dated May 19, 2016 in U.S. Appl. No. 29/484,466.
Office Action dated Nov. 16, 2016 in U.S. Appl. No. 29/508,364.
Supplementary European Search Report dated Nov. 14, 2013 in European Patent Application No. 09830774.7.
Canadian Office Action dated Aug. 16, 2016 in Canadian Patent Application No. 2,774,810.
Canadian Office Action dated Oct. 15, 2015 in Canadian Patent Application No. 2,774,810.
Notification of Reasons for Refusal dated Oct. 28, 2013 in Japanese Patent Application No. 2011-538613.
International Search Report dated May 24, 2010 in International Patent Application No. PCT/US2009/059837.
Written Opinion dated May 24, 2010 in International Patent Application No. PCT/US2009/059837.
Office Action dated Jun. 15, 2017 in U.S. Appl. No. 29/554,344.
Office Action dated Nov. 14, 2017 in U.S. Appl. No. 29/554,344.
GB 2051937 Registered Design Application, (La Brosse et Dupont SA) Mar. 18, 1996, [online], [retrieved on Nov. 21, 2012] Retrieved from the Design Database of the Intellectual Property Office of the United Kingdom using the Internet: <URL: http://www.ipo.gov.uk>.*
KR 300022366 Registered Design Bibliography, May 15, 1978, [online], [retrieved on Nov. 15, 2012] Retrieved from the Design Database of the Korean Intellectual Property Rights Information Service using Internet: <URL: http://eng.kipris.or.kr>.*
CN 301434919 Registered Design, (Qin, Bingxian) Jan. 12, 2011, [online], [retrieved on Jan. 13, 2013] Retrieved from the Questel Intellectual Property Portal Design Database using the Internet: <URL: http://www.orbit.com>.*

* cited by examiner

[Canceled]

[Canceled]

[Canceled]

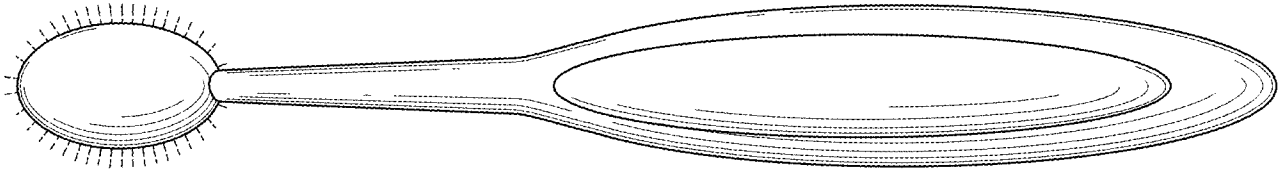
Fig. 4 New
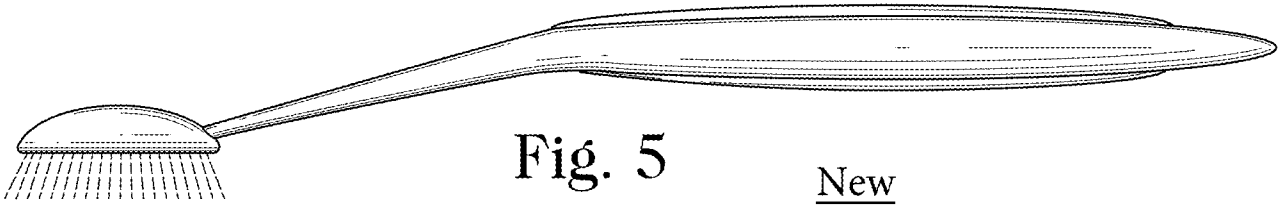
Fig. 5 New
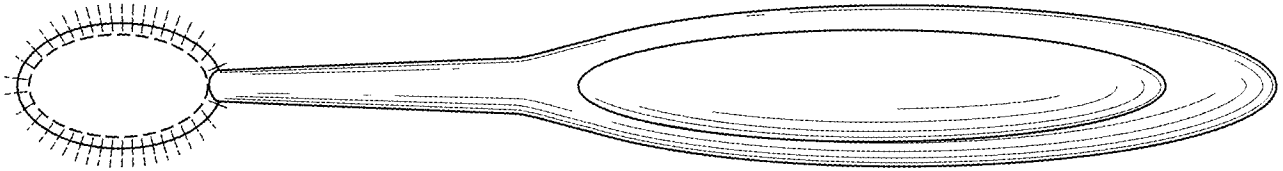
Fig. 6 New

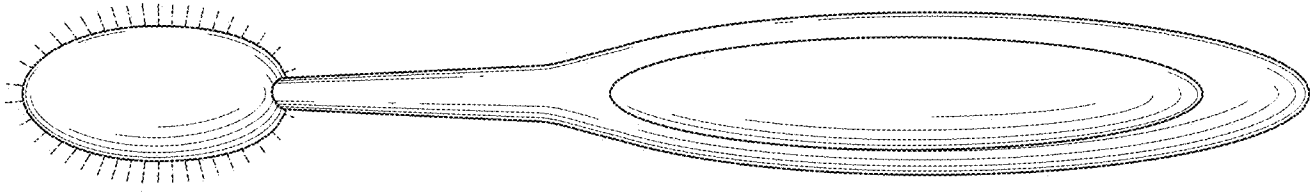
Fig. 7 New
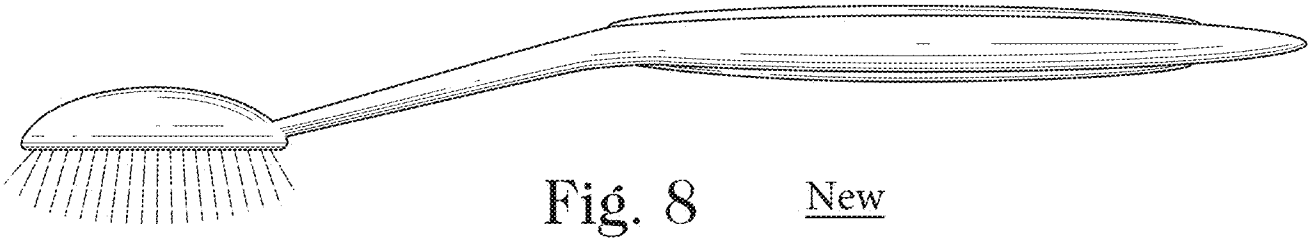
Fig. 8 New
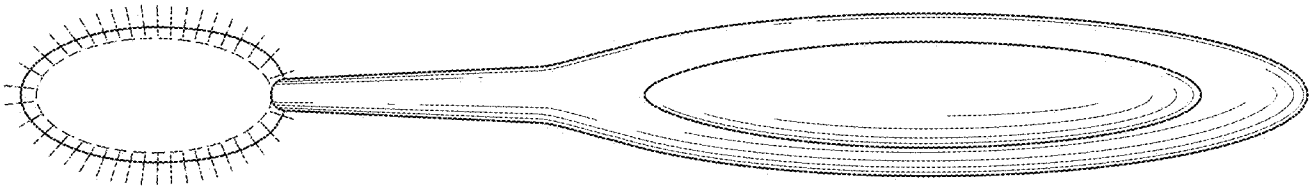
Fig. 9 New